Figure 1:
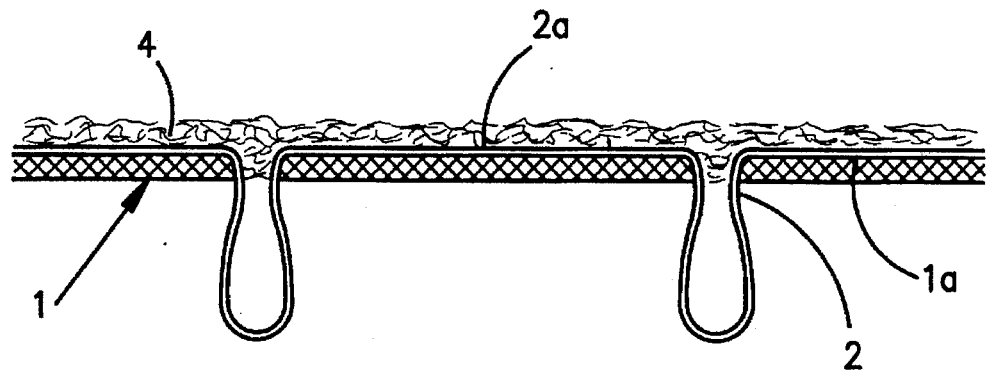

United States Patent [19]

Tesch

[11] Patent Number: 5,660,911
[45] Date of Patent: Aug. 26, 1997

[54] TUFTED CARPET AND PROCESS FOR PRODUCING THE SAME

[76] Inventor: Günter Tesch, Avenue Jean-Marie-Musy 15, CH-1700 Fribourg, Switzerland

[21] Appl. No.: 495,673

[22] PCT Filed: Dec. 2, 1993

[86] PCT No.: PCT/EP93/03393

§ 371 Date: Jul. 28, 1995

§ 102(e) Date: Jul. 28, 1995

[87] PCT Pub. No.: WO95/15411

PCT Pub. Date: Jun. 8, 1995

[51] Int. Cl.$^6$ .............................. B32B 3/02; B32B 5/16; D04H 1/46
[52] U.S. Cl. .............................. 428/95; 428/85; 28/112; 156/72; 156/148
[58] Field of Search .............................. 428/85, 95, 282, 428/296, 283; 28/112; 156/72, 148

[56] References Cited

U.S. PATENT DOCUMENTS

| | | |
|---|---|---|
| 3,515,622 | 6/1970 | Jordan . |
| 3,817,817 | 6/1974 | Pickens, Jr. et al. ............ 428/95 |
| 4,035,533 | 7/1977 | Chambley . |
| 4,199,635 | 4/1980 | Parker ............ 428/95 |
| 4,294,876 | 10/1981 | Camden et al. ............ 428/95 |
| 4,371,576 | 2/1983 | Machell ............ 428/95 |
| 5,080,951 | 1/1992 | Guthrie ............ 428/85 |
| 5,547,731 | 8/1996 | Tesch ............ 428/85 |

FOREIGN PATENT DOCUMENTS

| | | |
|---|---|---|
| 734 749 | 12/1969 | Belgium . |
| 2032599 | 6/1992 | Canada . |
| 280 290 | 7/1990 | German Dem. Rep. . |
| 14 35 762 | 12/1968 | Germany . |
| 42 17 438 | 12/1993 | Germany . |
| 1 150 451 | 4/1969 | United Kingdom . |
| 93 24698 | 12/1993 | WIPO . |

*Primary Examiner*—Terrel Morris
*Attorney, Agent, or Firm*—Bacon & Thomas

[57] ABSTRACT

A tufted carpet is described in which the tufting yarns (2) are tufted into a tufting backing (1) and firmly joined to it. The back side (1a) of the tufted carpet (1) has a layer (5) comprising pieces of thermoplastic plastic sheet material joined together under the influence of pressure and temperature. Back ends (2a) of the tufting yarns (2) are firmly bound into the layer (5).

15 Claims, 2 Drawing Sheets

TUFTED CARPET AND PROCESS FOR PRODUCING THE SAME

This application is a §371 of international patent application No. PCT/EP93/00383, filed Dec. 2, 1993.

The invention relates to a tufted carpet or carpeting having tufted yarns tufted into a tufting backing and joined to it, and to a method for producing it.

Tufted carpets have a tufting backing and tufting yarns, tufted into it, which form loops on the back of the tufting backing. In a finished carpet, the loops are either left in that form or cut, then forming the carpet pile. The tufting yarns are tufted relatively loosely into the tufting backing and extend intermittently parallel to the plane of the tufting backing. To assure that the tufting yarns will be retained in the backing and will not pull out of it, such a carpet must be treated with latex. Latex coating systems are expensive, and in particular the actual latex coating process is followed by a complicating drying process. They require rooms of a size on the order of 8 m×40 m. A drying process presents problems of ventilation. In some cases, the operation of tuft insertion and coating with latex are even made separate from one another; that is, the tufted intermediate products are taken to a special coating system at a different place. This is disadvantageous and makes the production process of such carpets more expensive.

U.S. Pat. No. 4,705,706 discloses a tufted carpet in which the tufting backing comprises three backing layers, for the sake of firmly anchoring the tufting yarns. The solid connection of the tufted yarns to the backing is achieved by heating during the production process. The aforementioned tufting backing layers are needed to prevent the vulnerable carpet material from being destroyed by the effect of heat.

The object of the present invention is to embody a tufted carpet of this generic type such that no latex is needed in its manufacture. The method for producing such a carpet should be economical and simple, while avoiding the aforementioned disadvantages.

This object is attained by the invention as defined by the main claim. The process for producing such a carpet characterized in that pieces of plastic sheet material are applied uniformly to make a layer on the back side of a tufting backing tufted with tufting yarns and are joined to the tufting yarns and to one another under heat and pressure, causing firm binding in the back ends of the tufted yarns.

The heat and temperature may be applied by a warm rolling or pressing operation. The tufting backing may be needle-punched with binding fibers, in particular polyethylene binding fibers, prior to the tufting operation. The tufting backing may be provided with an adhesive layer prior to the tufting process.

Furthermore, a secondary backing may be applied to the layer of pieces of thermoplastic material and may be joined to the plastic sheet layer by means of a simultaneous or subsequent warm rolling or pressing operation, causing firm bonding of the back ends of the tufting yarns into the plastic sheet layer. That is, the object is attained by the tufted carpet or carpeting of the present invention which comprises a tufted primary backing having pile tufts extending from one side thereof with back ends of tufts on the opposite surface and thermally bonded to said opposite surface a layer composed of pieces of thermoplastic sheet material wherein the pieces of thermoplastic sheet material have been fused to the tufted backing under heat and pressure sufficient to embed said back ends in the layer and to the primary backing.

The tufted carpet according to the invention comprises a tufting backing, in which the tufting yarns, initially inserted loosely, are firmly anchored by the provision that their back ends are bound into a layer, disposed on the back of the tufting backing, of sheet-like plastic material in the form of piece goods, which has been made sticky by pressure and the effects of temperature. The tufting yarns are so firmly joined to the tufting backing that the addition of latex is no longer necessary, and the yarns do not pull out of the finished carpet. The back ends of the tufting yarns, as a result of the densification and/or at least partial melting of the pieces of sheet material by the influence of pressure and heat, are firmly enclosed by the sheet material; they are firmly bonded to the sheet material, which is in a molten state or sticky from the effect of heat.

If a still firmer bond of the tufting yarns in the tufting backing is to be attained, then a binder layer, such as a needle-punched fiber binding layer, especially with binding fibers of polyethylene, is needle-punched from the tuft side. The binding fiber layer forms an increased binding volume toward the tufting yarns from the underside of the carpet.

On the back side of the tufting backing, a second back can be applied in a simple way by means of the plastic sheet layer. It is placed over the plastic sheet layer and bonded to the tufting backing under the influence of temperature and pressure by the melting of the plastic material. The second back thus applied not only contributes to better securing and anchoring of the back ends of the tufting yarns, but also increases both the elasticity in response to traffic, and the heat insulation and noise abatement properties of the carpet.

It is advantageous if the pieces of sheet material is nonflat and is of polyethylene. As a result, the unbonded tufted tufting backing can be densified by the effect of temperature and pressure, preferably by heating above the melting temperature of the plastic, such that the tufting yarns are "co-melted" in with the plastic material. The application of a nonflat sheet material that has a high bulk volume is simpler than applying a layer of flat pieces of sheet. The sheet material used can be increased in volume such that it is present in three-dimensionally deformed form. In intrinsically flat sheets, a number of places distributed over the surface can be stretched or deformed in such a way as to produce protuberances and bumps. It is also advantageous, however, that strips or pieces of sheetlike plastic material that are already in nonflat form can be worked in jointly as well. In particular, plastic sheet trimmings can be processed. Since such sheets are processed with one another and with the tufting yarns by rolling or pressing, usually at elevated temperature, their differing properties arising for instance from different materials, or their thickness or color do not play any substantial role. What is essential is the softening point, that is, the temperature at which the material becomes sticky and thus capable of bonding. At a temperature of 110° C., for instance, or in other words slightly below the polyethylene melting temperature. The waste material can be used in its original form, for instance with its original coloring made up of printed material or a background color, and so forth.

The use of pieces of sheet whose volume has been increased also has the advantage that in a simple way, under pressure, they fill out the interstices between rows of yarn and the spaces around the yarn loop quite well.

The method for producing the tufted carpet according to the invention is characterized in that pieces of plastic material in sheet form is first applied to a uniform layer thickness, including the option of multiple plies, on the back side of a loosely tufted tufting backing and bonded to one another by the influence of pressure and temperature, preferably by means of a warm rolling or pressing operation, so that the back ends of the tufting yarns are firmly bound in. The warm rolling or pressing operation not only achieves better bonding of the tufting yarns to the tufting backing; it is also possible to produce carpets of different stiffness and thickness by means of variously pronounced densification or a variously thick layer of the pieces of sheet-like material. It is advantageous if the sheets are heated up to their melting temperature, and the back ends of the tufting yarns are firmly bonded to the backing by means of the melting sheets and bound into the sheets. The action of heat is exerted from the back side of the carpet, thus preventing excessive deformation of the carpet pile.

The quantity of pieces of sheet material applied can either correspond to the quantity necessary for adequate adhesive bonding, or it may be dimensioned such that there is an excess, producing a substantially heavier and stiffer product. The excess pieces of sheet material can also be mixed with another material, in order to vary the elasticity, thickness, rollability; and ease of carpet laying. For better ease of laying, the back can be embossed or roughened.

In accordance with an advantageous feature, it may also be provided that before or during the rolling or pressing operation, a second tufting backing is placed on the tufting backing that is provided with the layer of sheet material and is bound to the latter layer by the ensuing action of pressure and temperature. The second backing may comprise nonwoven or woven fabric.

If normally the tufting yarns are not bound relative to the backing, then the bonding is reinforced, especially for especially high-traffic carpets, by providing that before the tufting yarns are tufted, i.e., inserted, the tufting backing is provided with a layer of thermoplastic sheeting or with an adhesive layer. The layer of thermoplastic sheet may be polyethylene, for instance, and can be placed loosely on the tufting backing or bonded beforehand to it. Particularly by needle punching of a layer of binding fiber, better binding of the tufting yarns to the tufting backing is attainable. The bonding of this kind of binder layer to the backing is done in particular in a single heat-pressing process, in which the layer of plastic sheeting is also applied to the backing the tufting yarns being bound in the process.

The subject of the invention will be described in further in conjunction with drawings.

Shown are:

FIG. 1: a schematic, enlarged view of a tufting backing with loosely inserted yarns and with a layer of pieces of plastic sheeting.

Figure 2:
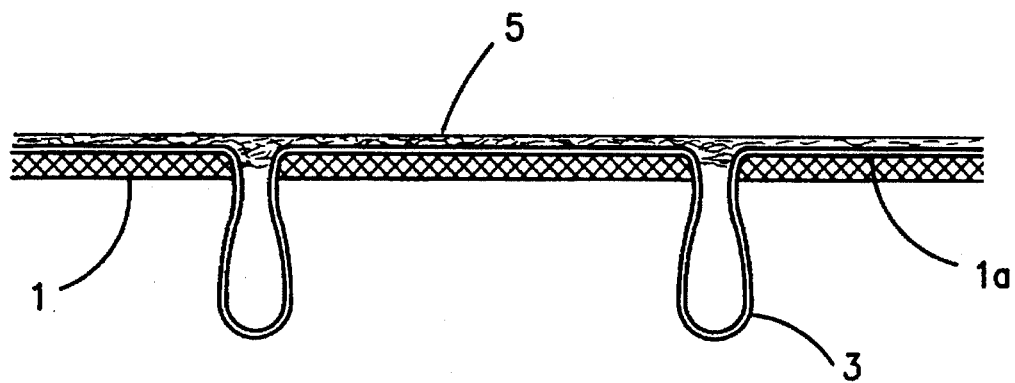

FIG. 2: a schematic, enlarged view of the tufted carpet according to the invention.

Figure 3:
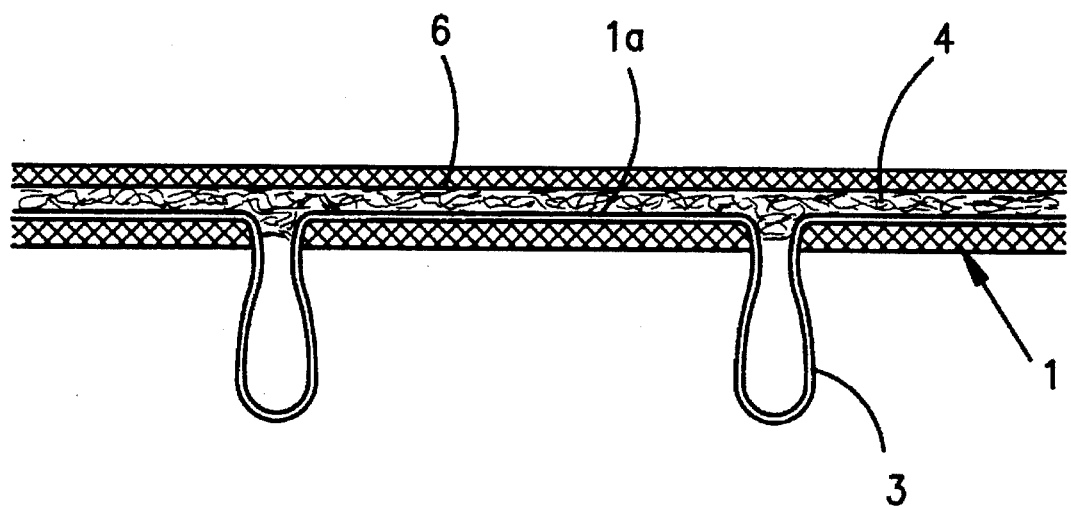

FIG. 3: a view corresponding to FIG. 1, with a second backing.

Figure 4:
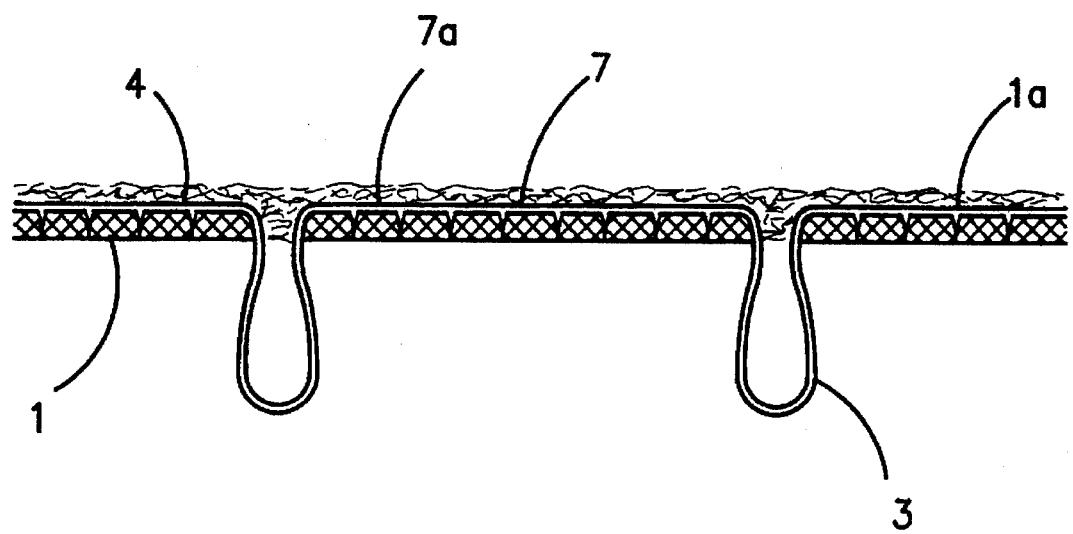

FIG. 4: a schematic, enlarged view of a tufting backing with loosely inserted yarns and with needle-punched binding fibers.

The tufted carpet according to the invention has a tufting backing 1 with tufting yarns 2 initially inserted loosely. The tufting backing 1 comprises a woven or nonwoven fabric. The tufting yarns 2, after insertion through the backing 1, form loops 3, and on the back side 1a of the backing 1 they extend parallel to it, forming the back ends 2a. In FIG. 1, a layer 4 of loose pieces of plastic sheeting is shown, deposited on the back side 1a of the tufting backing 1. This layer 4, under the influence of pressure and temperature, with the temperature being in the range of the melting temperature of the plastic used but typically not reaching that temperature, forms a thinner layer 5, in which the pieces of plastic sheeting are firmly joined together and to some extent are in firmly adhesively bonded or molten form. The back ends 2a of the tufting yarns 2 are firmly bound into this layer 5. As a result, the tufting yarns 2 can no longer pull out of the finished carpet (FIG. 2). In FIG. 3, a tufting backing 1 is shown with the layer 4 of piece-goods plastic sheeting and with a second back 6 before the heat-pressing process. By the influence of pressure and temperature, especially in a warm rolling or pressing operation, all the components are joined together to make a carpet product.

In FIG. 4, a tufting backing 1 is shown, with loosely inserted tufting yarns 2 and with needle-punched binding fibers 7. The binding fibers 7 are needle-punched into the tufting backing 1 before the yarns 2 are inserted. In their segments 7a on the back side 1a of the tufting backing 1, they form additional binding volumes for the back ends 2a of the tufting yarns 2.

We claim:

1. A tufted carpet comprising a tufted primary backing having pile tufts extending from one side thereof with back ends of tufts on, an opposite surface and thermally bonded to said opposite surface a layer composed of pieces of thermoplastic sheet material wherein the pieces of thermoplastic sheet material have been fused to the tufted backing under heat and pressure sufficient to embed said back ends in the layer and to the primary backing, and further comprising binding fibers of a material whose melting temperature is lower than that of the tufting yarns, which fibers are needle-punched into said opposite surface of the tufted primary backing.

2. The carpet of claim 1 wherein the pieces of plastic sheet material comprise pieces of polyethylene sheets.

3. The carpet of claim 2 wherein the plastic sheet pieces are not flat pieces.

4. The carpet of claim 3 wherein the plastic sheet pieces have a bulk volume that is at least one and a half times to ten times as great as the volume of the plastic sheet material.

5. The carpet of claim 1 wherein the pieces of plastic sheet material are derived from sheet trimmings.

6. The carpet of claim 1 which further comprises a secondary backing.

7. A tufted carpet comprising a tufted primary backing having pile tufts extending from one side thereof with back ends of tufts on an opposite surface and thermally bonded to said opposite surface a layer composed of pieces of thermoplastic sheet material wherein the pieces of thermoplastic sheet material have been fused to the tufted backing under heat and pressure sufficient to embed said back ends in the layer and to the primary backing, and wherein the pieces of thermoplastic sheet material are three dimensional and have a bulk volume that is one and a half to ten times as great as the volume of the sheet material.

8. The carpet of claim 7 wherein the pieces of plastic sheet material comprise pieces of polyethylene sheets.

9. The carpet of claim 7 which further comprises a secondary backing.

10. A method for producing a tufted carpet comprising:

applying a uniform layer of pieces of thermoplastic sheet material on the backside of a primary tufting backing;

tufting the primary backing with tufting yarns such that pile tufts extend from the front side of the backing and back ends of the tufting yarns remain in the primary backing; and heating and applying pressure to the pieces of thermoplastic sheet material to fuse the pieces to one another and to the back ends of the tufting yarns.

11. The method of claim 10 wherein heat and pressure is applied by a warm rolling or pressing operation.

12. The method of claim 10 wherein the primary tufting backing is needle punched with binding fibers from the back side of the tufting backing prior to the tufting step.

13. The method of claim 12 wherein the binding fibers are polyethylene binding fibers.

14. The method of claim 10 wherein an adhesive layer is applied to the primary tufting backing prior to the tufting step.

15. The method of claim 10 wherein a secondary backing is applied to the layer of pieces of thermoplastic material prior to heating and applying pressure.

* * * * *